US012459263B2

(12) United States Patent
Nakata

(10) Patent No.: US 12,459,263 B2
(45) **Date of Patent: *Nov. 4, 2025**

(54) RECORDING DEVICE

(71) Applicant: SEIKO EPSON CORPORATION, Tokyo (JP)

(72) Inventor: Satoshi Nakata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,919

(22) Filed: May 2, 2024

(65) Prior Publication Data

US 2024/0278574 A1 Aug. 22, 2024

Related U.S. Application Data

(63) Continuation of application No. 17/658,853, filed on Apr. 12, 2022, now Pat. No. 11,981,139.

(30) Foreign Application Priority Data

Apr. 15, 2021 (JP) ................................ 2021-068905

(51) Int. Cl.
*B41J 2/165* (2006.01)
*B41J 2/17* (2006.01)

(52) U.S. Cl.
CPC ....... *B41J 2/16517* (2013.01); *B41J 2/16523* (2013.01); *B41J 2/1721* (2013.01)

(58) Field of Classification Search
CPC .......................... B41J 2/16517; B41J 2/16508
See application file for complete search history.

(56) References Cited

U.S. PATENT DOCUMENTS

| | | | | |
|---|---|---|---|---|
| 6,247,805 | B1 | 6/2001 | Iwaya | |
| 11,981,139 | B2 * | 5/2024 | Nakata | B41J 2/16532 |
| 2019/0016143 | A1 | 1/2019 | Ochiai et al. | |
| 2021/0213765 | A1 | 7/2021 | Tamamori et al. | |
| 2022/0134761 | A1 | 5/2022 | Yamada | |

FOREIGN PATENT DOCUMENTS

| | | |
|---|---|---|
| JP | H03-189162 | 8/1991 |
| JP | H11-070663 | 3/1999 |
| JP | 2006-142575 | 6/2006 |
| JP | 2007-130886 | 5/2007 |
| JP | 2007-160870 | 6/2007 |
| JP | 2014-166684 | 9/2014 |
| JP | 2016-124152 | 7/2016 |
| JP | 2016-203467 | 12/2016 |
| JP | 2019-130761 | 8/2019 |
| JP | 2021-109415 | 8/2021 |

* cited by examiner

*Primary Examiner* — Sharon Polk
(74) *Attorney, Agent, or Firm* — WORKMAN NYDEGGER

(57) ABSTRACT

A recording device includes a device body, a recording unit configured to record by ejecting liquid onto a medium, a waste liquid collecting unit configured to collect waste liquid generated inside the device body, a waste liquid storage unit configured to store the waste liquid collected via the waste liquid collecting unit, wherein the waste liquid storage unit is configured to be mountable to and removable from the device body and the waste liquid collecting unit includes a discharge portion configured to discharge the collected waste liquid to the waste liquid storage unit, and the discharge portion has a dam portion for blocking the waste liquid.

17 Claims, 15 Drawing Sheets

RECORDING DEVICE

This application is a continuation of U.S. patent application Ser. No. 17/658,853, filed Apr. 12, 2022, which claims priority to JP Application Serial Number 2021-068905, filed Apr. 15, 2021, the disclosure of which are hereby incorporated by reference herein in their entirety.

BACKGROUND

1. Technical Field

The present disclosure relates to a recording device.

2. Related Art

As shown in JP-A-2019-130761 there is known a liquid ejecting device including a waste liquid collecting container that stores waste liquid ejected from a liquid ejection head, and a discharge portion having an outlet that discharges the waste liquid to the waste liquid collecting container. The waste liquid collecting container is configured to be mountable to and removable from the discharge portion.

However, when replacing the waste liquid collecting container of the above device, ink may drip from the outlet between the time when the waste liquid collecting container is removed from the discharge portion and the time when a new waste liquid collecting container is mounted. Therefore, there is a possibility that various problems may occur, such as the inside of the device getting dirty by waste liquid and waste liquid adhering to the wiring substrate. Accordingly, it is an object of the present disclosure to suppress dripping of ink from the outlet between the time when a waste liquid holding container is removed and the time when a new waste liquid holding container is installed.

SUMMARY

A recording device includes a device body, a recording unit configured to record by ejecting liquid onto a medium, a waste liquid collecting unit configured to collect waste liquid generated inside the device body, a waste liquid storage unit configured to store the waste liquid collected via the waste liquid collecting unit, wherein the waste liquid storage unit is configured to be mountable to and removable from the device body and the waste liquid collecting unit includes a discharge portion configured to discharge the collected waste liquid to the waste liquid storage unit, and the discharge portion has a dam portion for damming up the waste liquid.

DESCRIPTION OF EMBODIMENTS

1. First Embodiment

First, configuration of a recording device 10 will be described. The recording device 10 of the present embodiment is a serial ink jet printer that performs recording by ejecting ink, as a liquid, onto a medium P (for example, paper).

Figure 1:
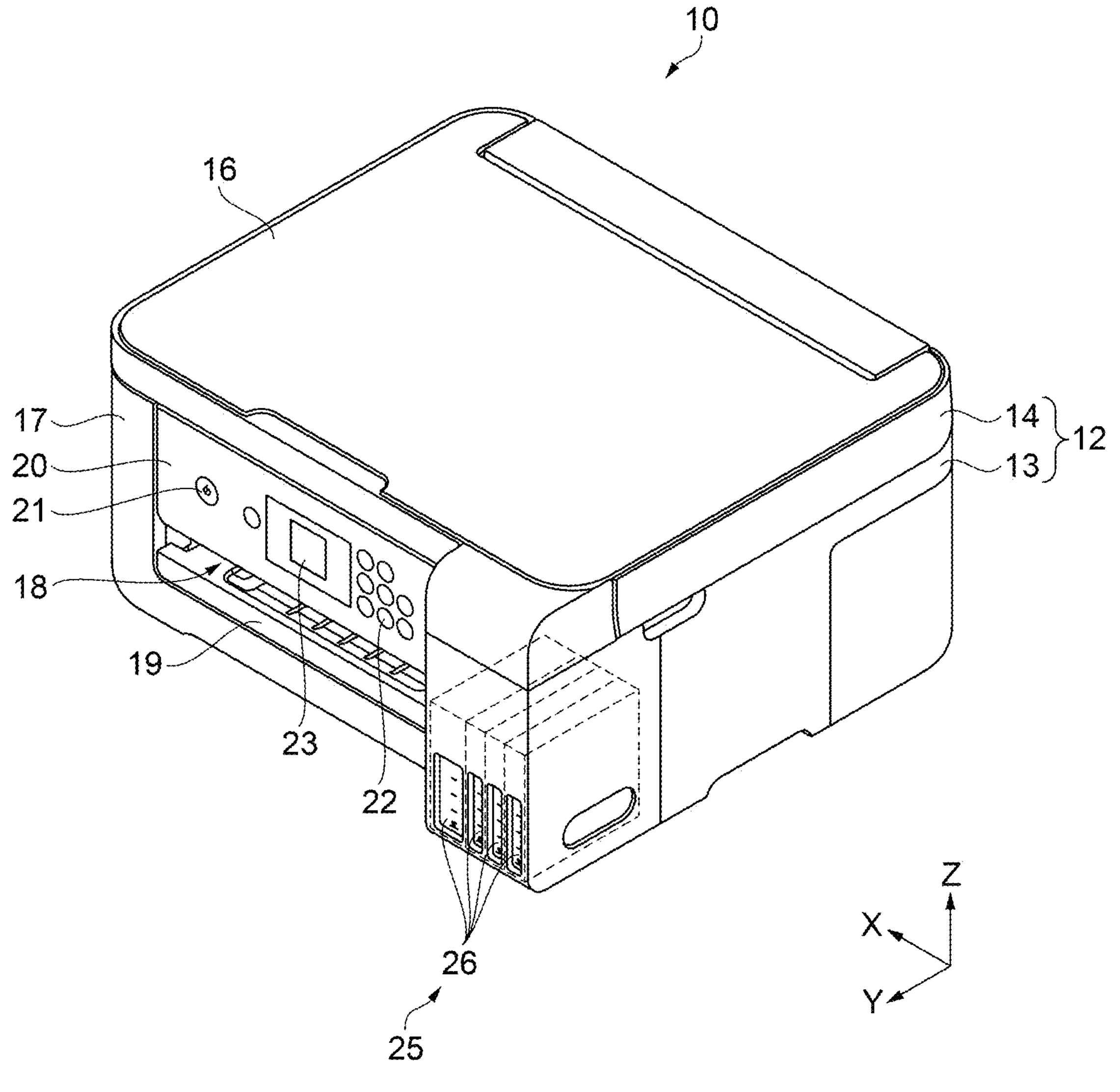
FIG. 1 is a perspective view showing configuration of a recording device according to the first embodiment.
Figure 2:
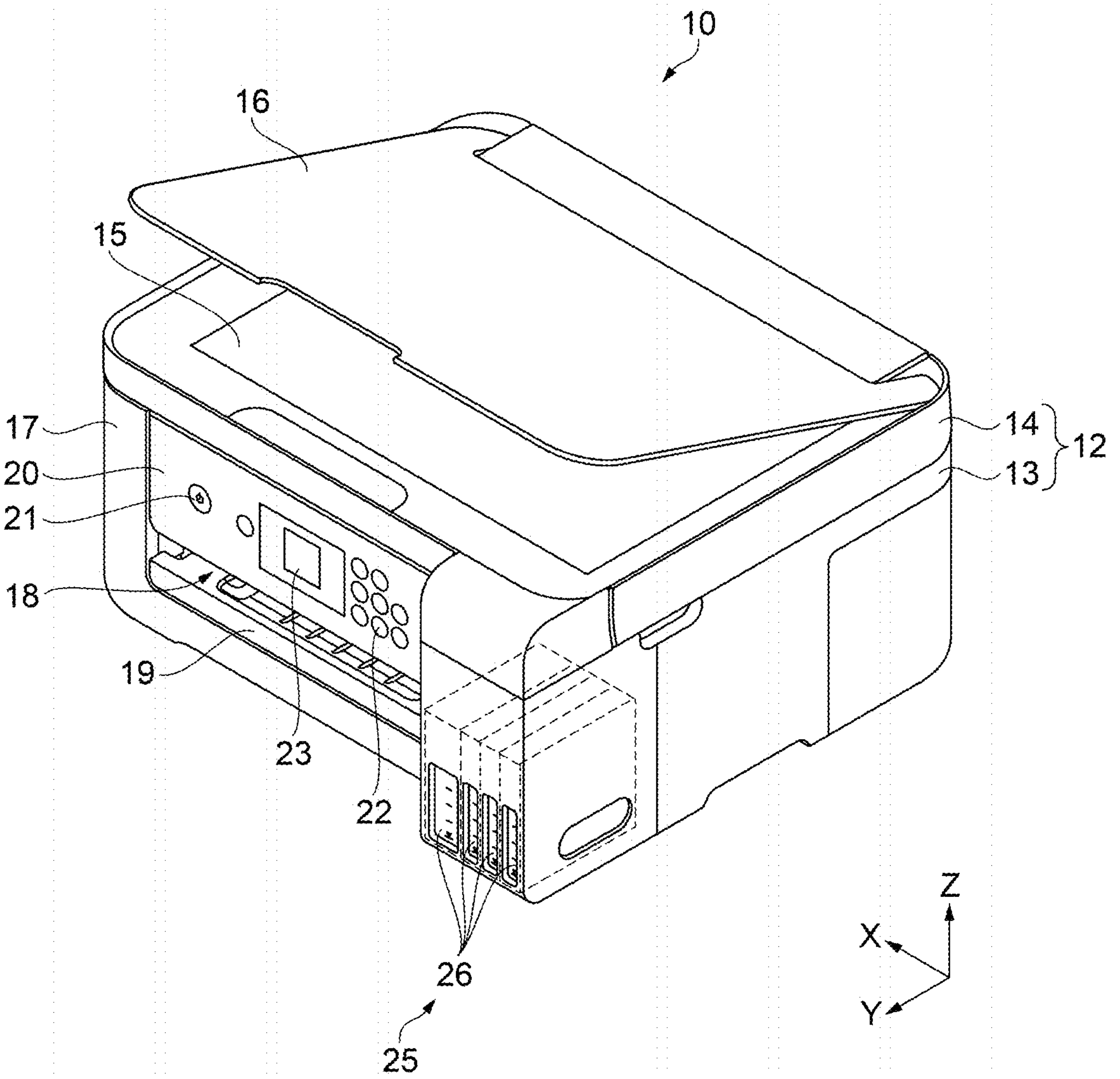
FIG. 2 is a perspective view showing configuration of the recording device according to the first embodiment.

FIGS. 1 and 2 are perspective views showing configuration of the recording device 10.

In a state in which the recording device 10 is installed on an XY plane (horizontal plane) parallel to an X-axis and a Y-axis, a direction along a Z-axis is the vertical direction, a +Z direction is the upward direction, and a −Z direction is the downward direction. The direction along the Y-axis is the forward-rearward direction, a +Y-direction side is the forward direction (front side), and a −Y-direction side is the rearward direction (back side). The direction along the X-axis is the left-right direction (width direction), a +X-direction side is the left direction, and a −X-direction side is the right direction.

As shown in FIGS. 1 and 2, the device body 12 includes a housing 13 having a substantially rectangular parallelepiped shape and a document reading device 14 disposed on the housing 13. The document reading device 14 includes a horizontal document placement surface 15 made of transparent glass or the like on which a document to be read is placed, and a document cover 16 capable of covering the document placement surface 15. By pivoting around an X-axis that extends in the width direction, the document cover 16 is openable and closable between a closed state (FIG. 1) of covering the document placement surface 15 from above and an opened state (FIG. 2) of being opened from the closed state to open up an area above the document placement surface 15.

On the outer surface of the housing 13, an outlet 18 for discharging the medium P from the inside is provided in the lower portion of the front 17, which is the front surface of the device body 12. A stacker 19 is provided inside the outlet 18, for supporting in a placed state the medium P discharged from the housing 13 toward the front side.

An operation unit 20 to be operated by a user of the recording device 10 is provided in an upper portion of the front 17 of the housing 13. The operation unit 20 is a horizontally elongated panel whose longitudinal direction is the width direction along the X-axis. The operation unit 20 is provided with a power button 21 that is operated to turn the recording device 10 on or off and operation buttons 22 that are operated when various types of operation information are input. Further, a liquid crystal display 23 is provided that is capable of displaying an operation state or the like of the recording device 10. The liquid crystal display 23 may be a touch panel.

Figure 3:
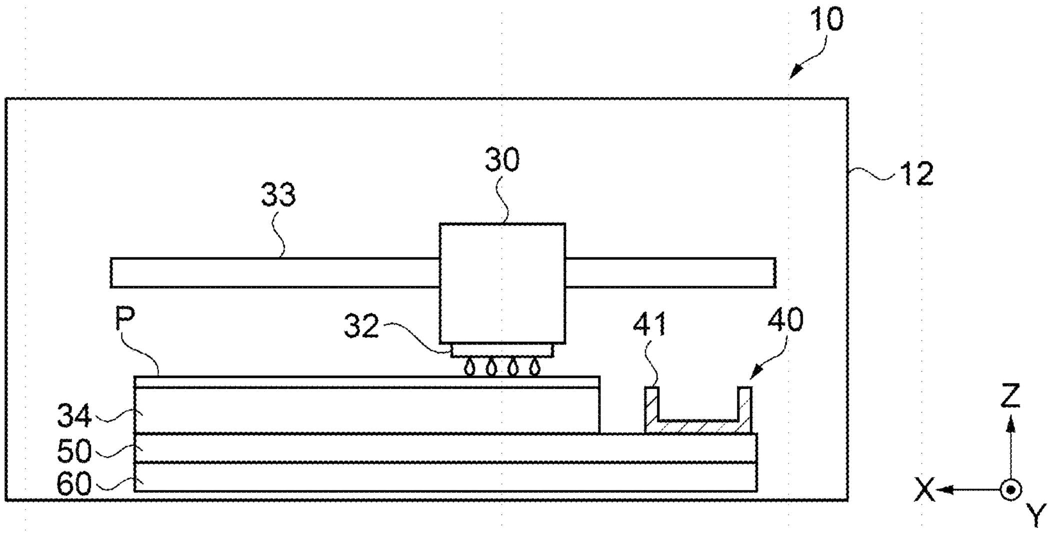
FIG. 3 is a schematic view showing internal configuration of the recording device according to the first embodiment.

An ink supply unit 25 is provided at the front 17 of the housing 13. The ink supply unit 25 supplies ink to a recording head 32 (FIG. 3). The ink supply unit 25 includes a plurality of ink tanks 26 and the like. The ink tanks 26 are containers capable of storing ink.

Next, internal configuration of the recording device 10 will be described.

As shown in FIG. 3, the recording device 10 includes a recording head 32 as a recording unit, and a carriage 30 on which the recording head 32 is mounted.

The carriage 30 is supported by a guide rail 33 extending in the direction along the X-axis, and is configured to be capable of reciprocating in the direction along the X-axis by a driving mechanism (not shown).

A platen 34 for supporting the medium P being conveyed is disposed below the recording head 32. The recording head 32 includes a plurality of nozzles and discharges ink as droplets onto the medium P supported by the platen 34. The platen 34 has a plate shape.

The recording device 10 includes a transport mechanism that transports the medium P from a paper feed unit (not shown) toward the outlet 18 via the platen 34. Then, an image, a document, or the like is recorded on the medium P by alternately performing a recording operation, in which the recording head 32 performs recording for one pass by ejecting liquid droplets while the carriage 30 moves along the X-axis, and a transport operation, in which the medium P is transported to the next recording position.

In the embodiment, the ink supply unit 25 and the ink tank 26 are off-carriage types arranged at a position different from that of the carriage 30, but the ink supply unit 25 and the ink tank 26 may be on-carriage types removably mounted on the carriage 30. In addition, the recording device 10 is not limited to being a serial type, and may be a line type in which the recording head 32 is an elongated line head disposed across the entire region of the maximum width of the medium P and droplets can be simultaneously discharged over the entire width of the medium P.

The recording device 10 further includes a cleaning unit 40. The cleaning unit 40 forcibly discharges ink and air from the recording head 32 (cleaning operation) in order to keep the recording head 32 in a normal state.

The cleaning unit 40 includes a cap 41. While the recording device 10 is not performing a recording operation, the carriage 30 is disposed at a home position which is a position separated from the recording region of the recording operation.

The cap 41 is disposed at the home position and is a box-like member with a bottom. The cap 41 is movable in a direction along the Z-axis by an elevating mechanism. The cap 41 by being raised is pressed against the lower surface side of the recording head 32. Thus, the cap 41 forms a closed space so as to cover the nozzles formed on the lower surface of the recording head 32. Drying of ink in the nozzles of the recording head 32 can be suppressed by this closed space.

The cap 41 is connected to a suction pump through a suction tube. By driving the suction pump in the closed space state, ink and air in the recording head 32 is sucked out through the suction tube. As a result, deteriorated ink (dried ink with higher viscosity) in the recording head 32 is sucked out, and the recording head 32 is maintained in (collected to) a normal state.

In order to keep the recording head 32 in a normal state, a flushing operation is periodically performed by forcibly ejecting ink from the recording head 32 toward the cap 41 to discharge the degraded ink of the recording head 32.

The ink discharged from the recording head 32 by the cleaning operation or the flushing operation is treated as waste liquid.

Waste liquid is also generated during so-called borderless printing. Specifically, at the time of recording by the recording head 32, ink ejected from the recording head 32 to the outside of the edge portions of the medium P becomes waste liquid.

As described above, waste liquid generated inside the device body 12 is collected by the waste liquid collecting unit 50. Waste liquid collected by the waste liquid collecting unit 50 is discharged to the waste liquid storage unit 60, and the discharged waste liquid is stored in the waste liquid storage unit 60.

Next, configuration of the waste liquid storage unit 60 will be described.

The waste liquid storage unit 60 stores, via the waste liquid collecting unit 50, waste liquid generated inside the device body 12.

The waste liquid storage unit 60 is mountable to and removable from the device body 12. Since there is a limit to the amount of waste liquid that can be stored in the waste liquid storage unit 60, it is necessary to replace the waste liquid storage unit 60 with a new waste liquid storage unit 60. Therefore, when the waste liquid in the waste liquid storage unit 60 has reached a specified storage amount, the waste liquid storage unit 60 presently in use is removed from the device body 12, and a new waste liquid storage unit 60 is mounted to the device body 12.

Figure 4:
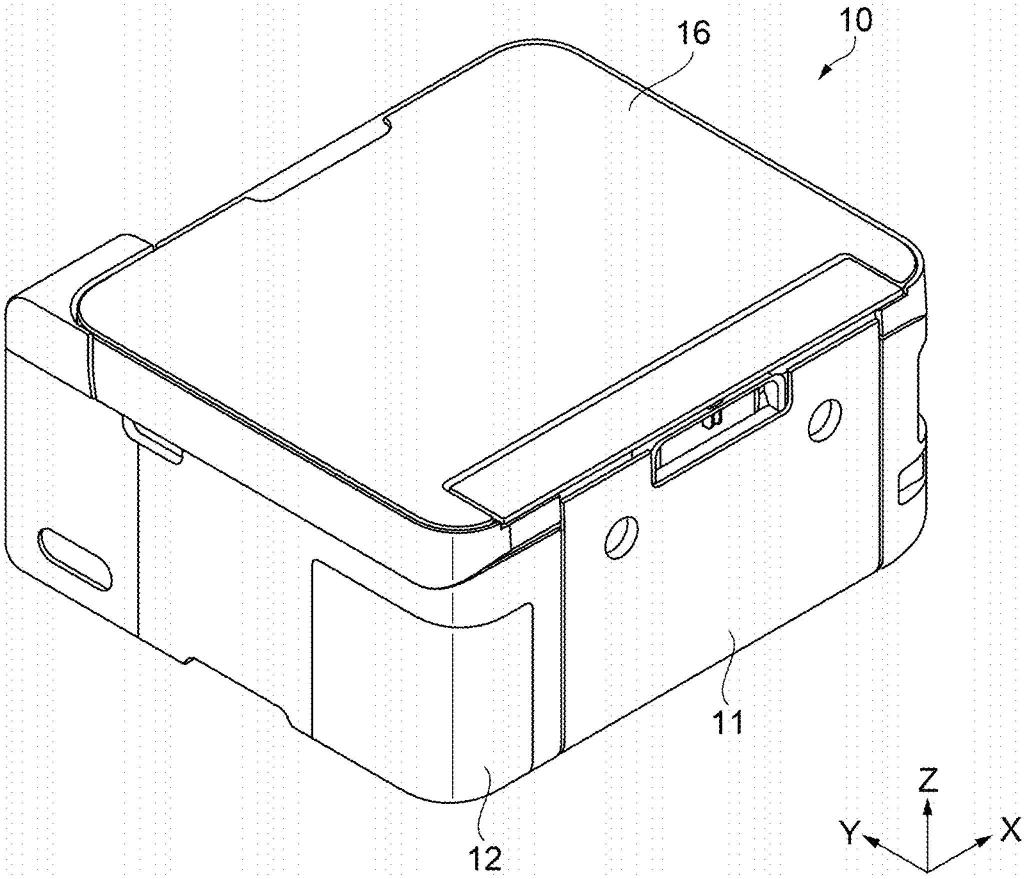
FIG. 4 is a perspective view showing configuration of the recording device according to the first embodiment.
Figure 5:
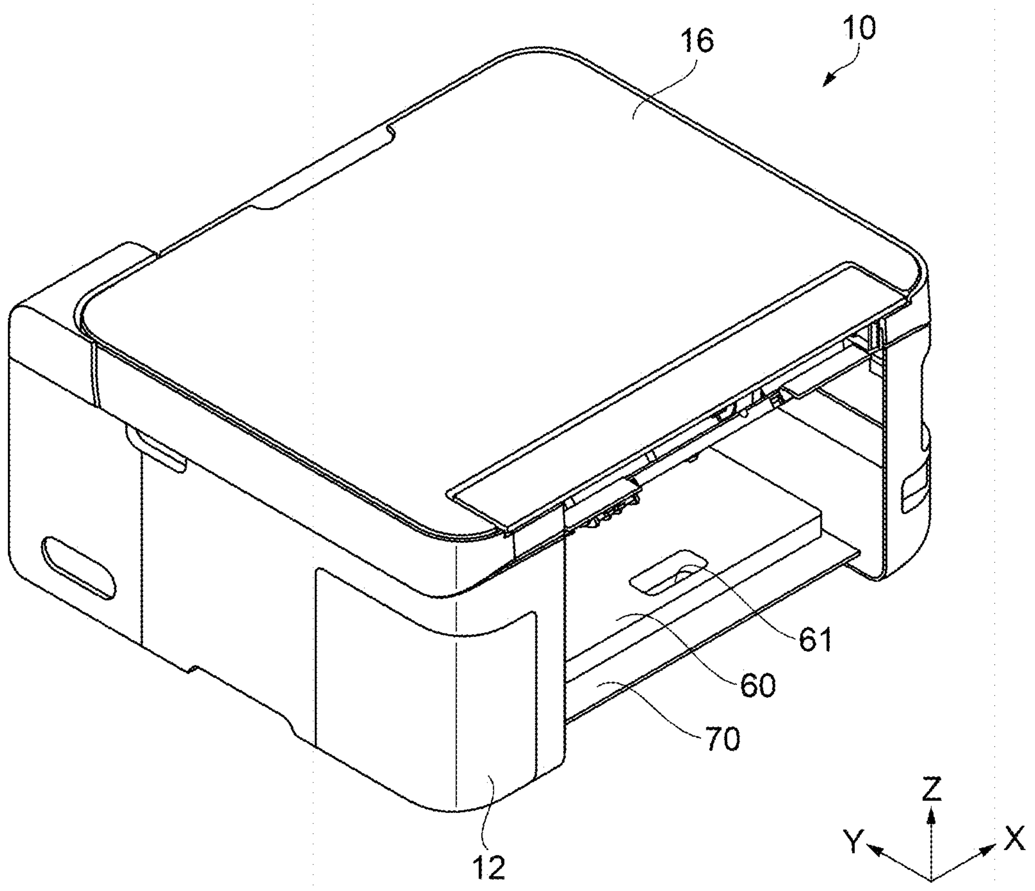
FIG. 5 is a perspective view showing configuration of a waste liquid storage unit according to the first embodiment.

The specified amount for waste liquid in the waste liquid storage unit 60 is determined by, for example, the cumulative amount of ink ejected from the recording head 32. When the cumulative amount of ejected ink reaches a specified amount, an indication that it is necessary to replace the waste liquid storage unit 60 is displayed on the liquid crystal display 23. In this case, the user removes from the device body 12, the rear cover 11 that is mounted to the back side of the device body 12 as shown in FIG. 4. As a result, the waste liquid storage unit 60 is exposed as shown in FIG. 5. The waste liquid storage unit 60 is disposed in a state supported by a bottom plate portion 70. A handle portion 61 for hooking a finger on is formed in the waste liquid storage unit 60. The user can remove the waste liquid storage unit 60 from the device body 12 by pulling the handle 61 in the −Y direction while his finger is hooked on the handle 61.

Figure 6:
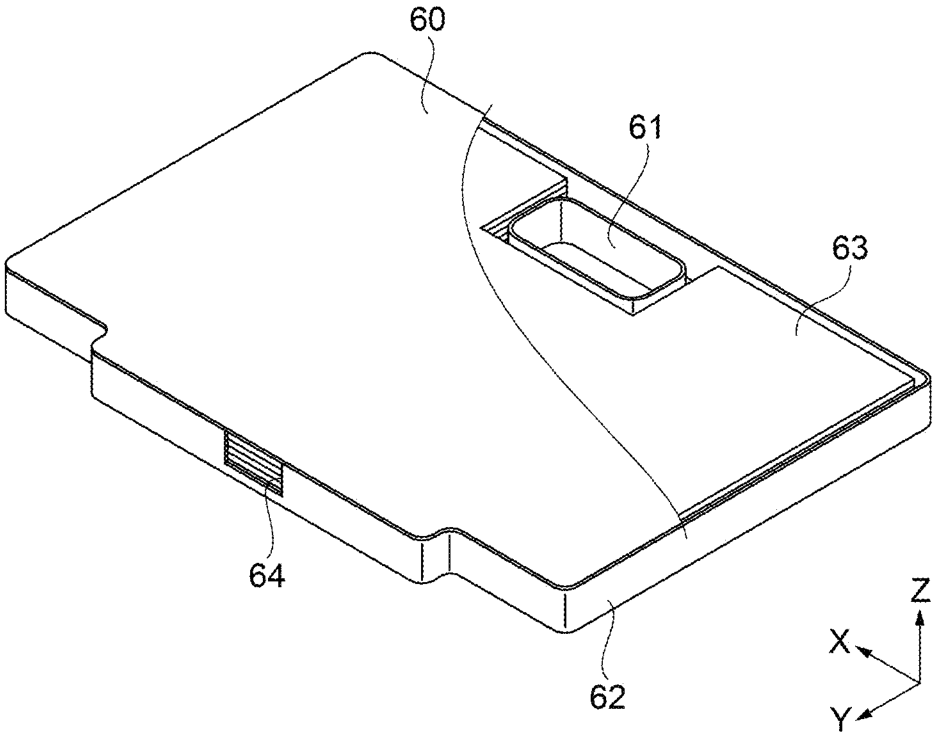
FIG. 6 is a perspective view showing configuration of the waste liquid storage unit according to the first embodiment.

FIG. 6 is a partially cutaway view showing configuration of the waste liquid storage unit 60. As shown in FIG. 6, the waste liquid storage unit 60 has a substantially rectangular parallelepiped shape, and includes a frame 62 formed of a resin material and a first absorber 63 accommodated inside the frame 62. The first absorber 63 is, for example, a non-woven fabric and absorbs waste liquid. The first absorber 63 is spread throughout the entire inside of the frame 62. Accordingly, since the waste liquid is held in a state of being absorbed by the first absorber 63, it is possible to suppress the waste liquid stored in the frame 62 from leaking out when the waste liquid storage unit 60 is removed from the device body 12.

An opening 64 (through hole) is formed in a part of the frame 62 of the waste liquid storage unit 60. In the present embodiment, the opening 64 is provided on the end surface of the frame 62 in the +Y direction. The waste liquid collected by the waste liquid collecting unit 50 is introduced into the first absorber 63 through the opening 64.

It should be noted that when the waste liquid storage unit 60 is to be mounted to the device body 12, the waste liquid storage unit 60 is inserted into the device body 12 with the opening 64 facing in the +Y direction, and the waste liquid storage unit 60 is set on the bottom plate portion 70. Then, the user attaches the rear cover 11 to the back side of the device body 12. When the new waste liquid storage unit 60 is replaced, the accumulated amount of ink discharged from the recording head 32 is reset.

Next, configuration of the waste liquid collecting unit 50 will be described.

Figure 7:
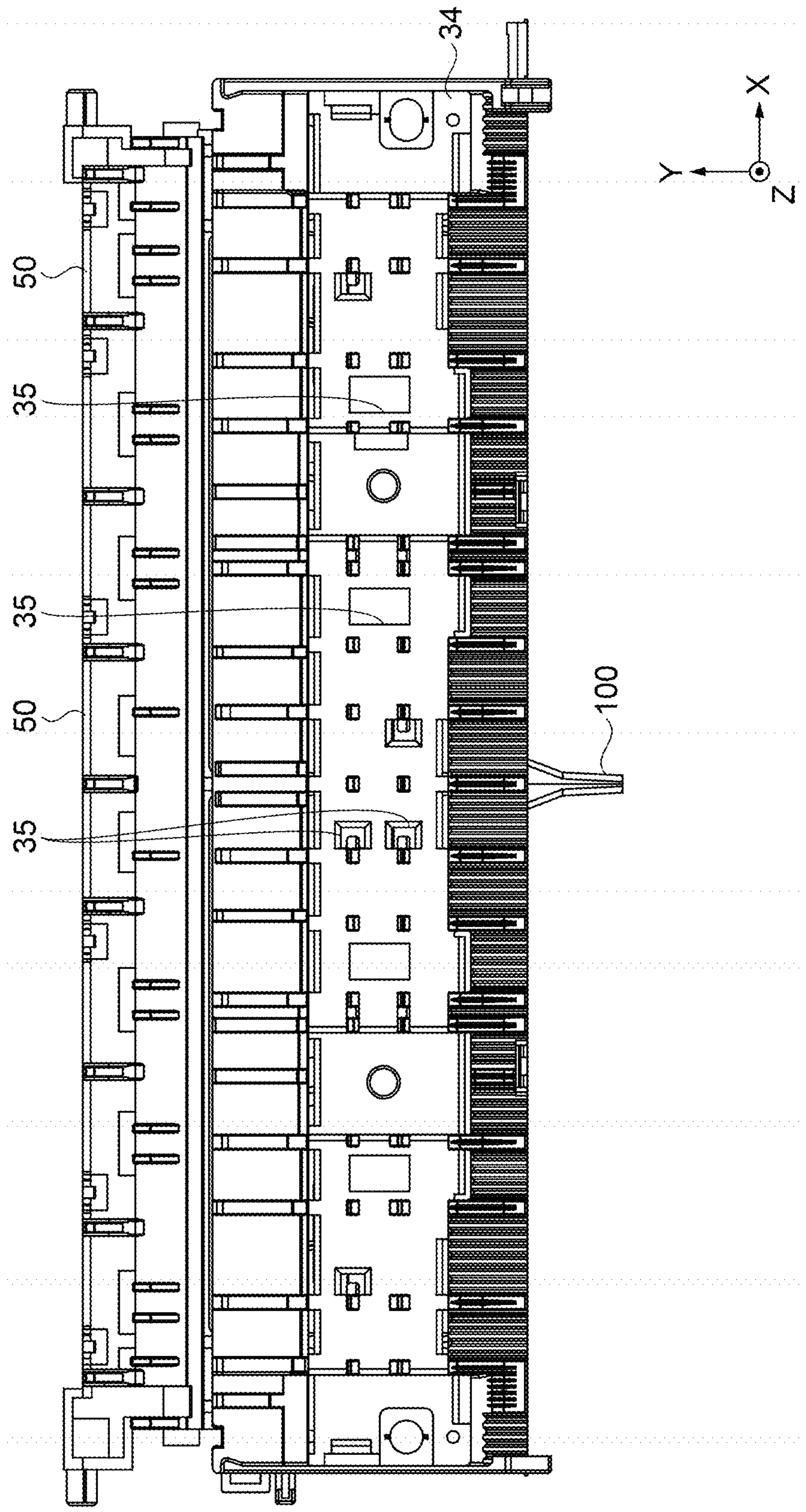
FIG. 7 is a plan view showing configuration of a waste liquid collecting unit according to the first embodiment.

As shown in FIG. 7, the waste liquid collecting unit 50 is disposed below the platen 34. The waste liquid collecting unit 50 has a plate shape and has a size capable of supporting the entire platen 34. The platen 34 is provided with a plurality of through holes 35. The through holes 35 are holes penetrating in the vertical direction, and are holes for guiding, to the waste liquid collecting unit 50 disposed below, waste liquid discharged to the outside of the edge of the medium P during borderless printing.

Figure 8:
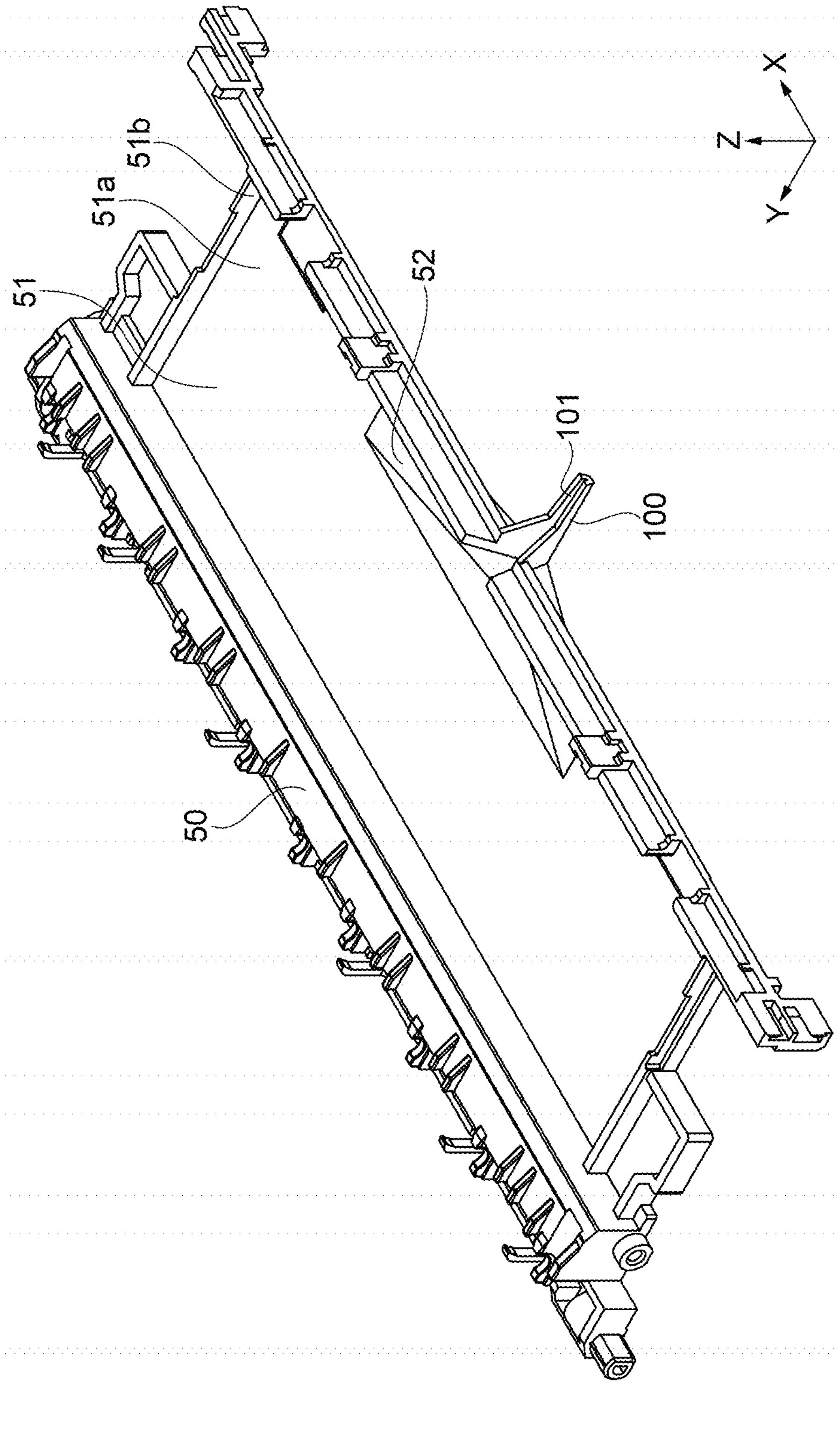
FIG. 8 is a perspective view showing configuration of the waste liquid collecting unit according to the first embodiment.

As shown in FIG. 8, the waste liquid collecting unit 50 includes a receiving portion 51 that receives waste liquid guided out from the platen 34. The receiving portion 51 has a flat portion 51*a* having a flat surface and a wall portion 51*b* demarcating the flat portion 51*a*, and receives waste liquid guided out from the platen 34 at the flat portion 51*a*, which is demarcated by the wall portion 51*b*.

The waste liquid collecting unit 50 has a recessed portion 52 which is recessed below the plane of the flat portion 51*a*. The recessed portion 52 is disposed at a central portion of the waste liquid collecting unit 50 in a direction along the X-axis. By this, waste liquid on the flat portion 51*a* can easily flow into the recessed portion 52.

The waste liquid collecting unit 50 is not limited to collection of waste liquid generated in borderless printing, and can collect, via the cap 41, waste liquid discharged during cleaning or waste liquid discharged during flushing by the cleaning unit 40.

The waste liquid collecting unit 50 includes a discharge portion 100 configured to discharge the collected waste liquid to the waste liquid storage unit 60. The discharge portion 100 of the present embodiment includes a groove portion 101 that protrudes in the −Y direction and through which the waste liquid flows. The groove portion 101 has an elongated recess along the Y-axis. The X-axis dimension of the outer shape of the discharge portion 100 gradually decreases in the −Y direction. The Z-axis dimension of the outer shape of the discharge portion 100 also decreases gradually in the −Y direction. That is, the outer shape of the discharge portion 100 is a shape that is pointed in the −Y direction. The discharge portion 100 protrudes in the −Y direction from the bottom of the recessed portion 52. The groove portion 101 inclines downward toward the −Y direction. Thus, the waste liquid can easily flow from the recessed portion 52 toward the waste liquid storage unit 60.

Note that although the discharge portion 100 of the present embodiment is disposed in the center portion of the waste liquid collecting unit 50 in the direction along the X-axis, the discharge portion 100 may be disposed to the +X-direction side or to the −X-direction side of the waste liquid collecting unit 50.

Figure 9:
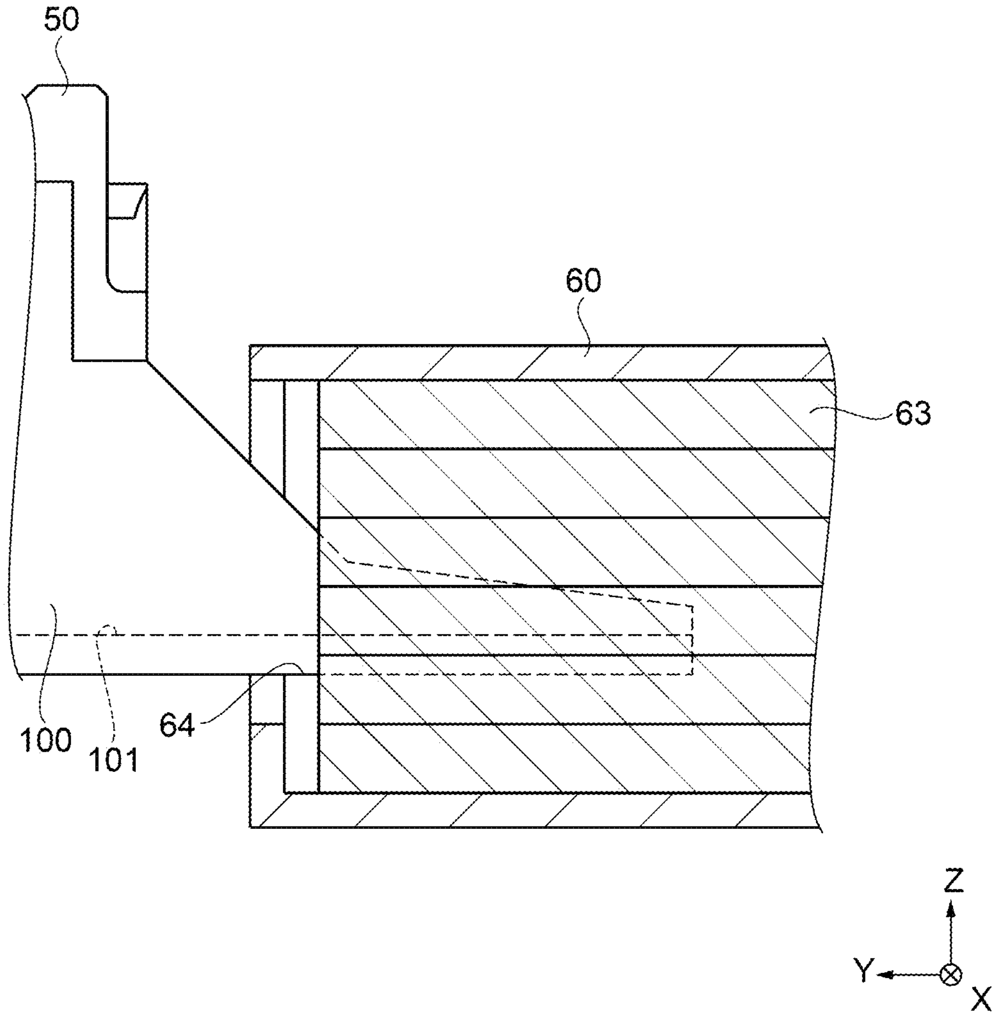
FIG. 9 is a side view showing configuration of the waste liquid collecting unit according to the first embodiment.

As shown in FIG. 9, the leading end portion of the discharge portion 100 in the −Y direction is inserted into the waste liquid storage unit 60 through the opening 64. Since the outer shape of the discharge portion 100 is pointed in the −Y direction, the discharge portion 100 can be easily inserted into the waste liquid storage unit 60. By inserting the discharge portion 100 into the waste liquid storage unit 60, the waste liquid can properly flow into the waste liquid storage unit 60. Since the first absorber 63 is spread throughout the inside of the waste liquid storage unit 60, the groove portion section 101 of the discharge portion 100 and the first absorber 63 easily contact each other. By this, liquid waste discharged through the groove portion 101 of the discharge portion 100 is absorbed by the first absorber 63.

Figure 10A:
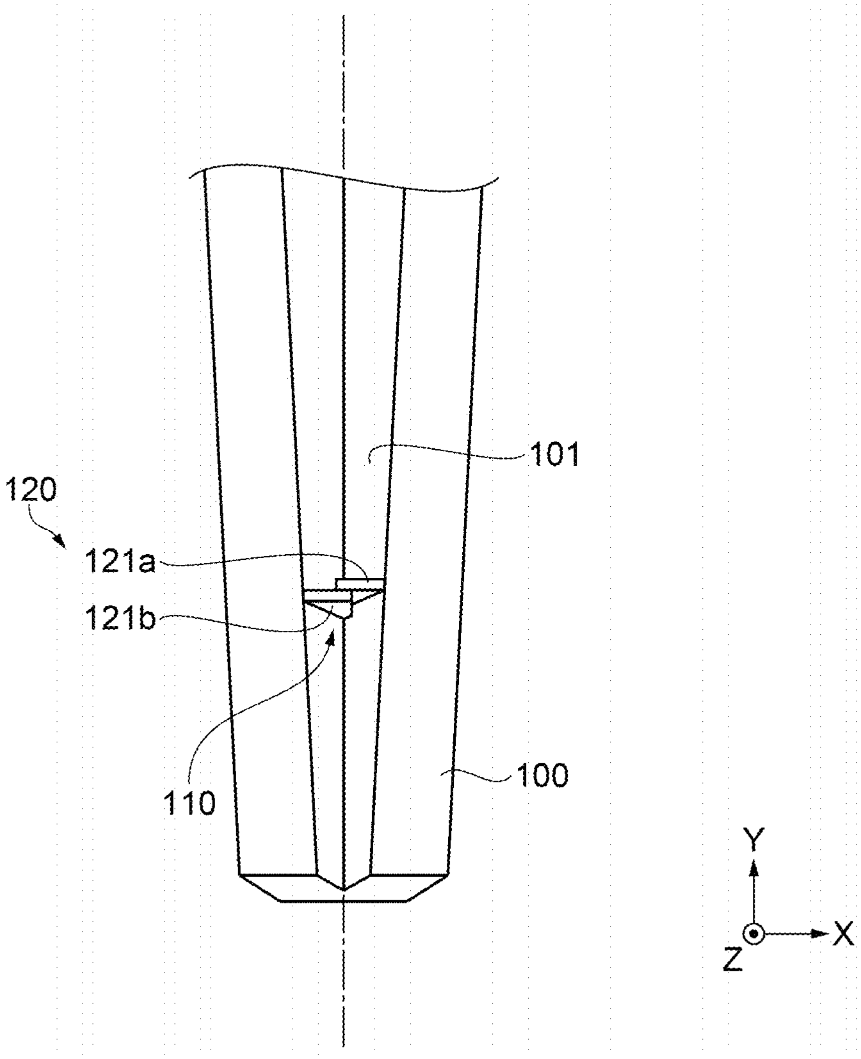
FIG. 10A is a plan view showing configuration of a discharge portion according to the first embodiment.

Here, as described above, the waste liquid storage unit 60 is mountable to and removable from the device body 12. That is, the waste liquid storage unit 60 of the present embodiment is mounted to and removed from the discharge portion 100 of the waste liquid collecting unit 50. Therefore, for example, when the waste liquid storage unit 60 is removed from the discharge portion 100, since the discharge portion 100 is exposed, ink may drip from the discharge portion 100 before a new waste liquid storage unit 60 is mounted, and the inside of the device body 12 may get dirty from the waste liquid. Therefore, as shown in FIG. 10A, the discharge portion 100 of the present embodiment has a dam portion 110 that dams up the waste liquid. As a result, while the waste liquid storage unit 60 is removed from the device body 12, the waste liquid flowing through the discharge portion 100 can temporarily accumulate because of the dam portion 110, and suppress dripping of waste liquid from the discharge portion 100. As a result, it is possible to suppress getting the inside the device body 12 dirty and the like due to the waste liquid.

The dam portion 110 of the present embodiment is provided in the groove portion 101. Thus, the waste liquid can be efficiently stopped. The dam portion 110 is disposed on the tip end side in the −Y direction of the discharge portion 100. That is, the dam portion 110 is disposed at a portion where the discharge portion 100 is inserted into the waste liquid storage unit 60.

The dam portion 110 of the present embodiment is an openable and closable valve 120. The valve 120 includes a first opening and closing plate 121*a* and a second opening and closing plate 121*b*. The first opening and closing plate 121*a* and the second opening and closing plate 121*b* are plate shaped. The first opening and closing plate 121*a* and the second opening and closing plate 121*b* have flexibility and are formed of, for example, a rubber material or a film material.

The valve 120 is in a closed state (FIG. 10A), in which the waste liquid is blocked, when the waste liquid storage unit 60 is removed from the waste liquid collecting unit 50 and the valve 120 is in an opened state (FIG. 10B), in which the waste liquid is not blocked, when the waste liquid storage unit 60 is mounted to the waste liquid collecting unit 50.

As shown in FIG. 10A, the first opening and closing plate 121 *a* is disposed from one wall portion of the groove portion 101 toward the center portion of the groove portion 101 in a direction along the X-axis. The second opening and closing plate 121*b* is disposed from the other wall portion of the groove portion 101 toward the center portion of the groove portion 101 in a direction along the X-axis. A part (free end) of the first opening and closing plate 121*a* and a part (free end) of the second opening and closing plate 121*b* overlap each other at the central portion of the groove portion 101. As a result, the valve 120 is disposed along the X-axis with respect to the groove portion 101, which is formed along the Y-axis. Therefore, when the waste liquid storage unit 60 is removed from the waste liquid collecting unit 50, the valve 120 provided in the groove portion 101 enters the closed state, and the waste liquid is blocked.

Figure 10B:
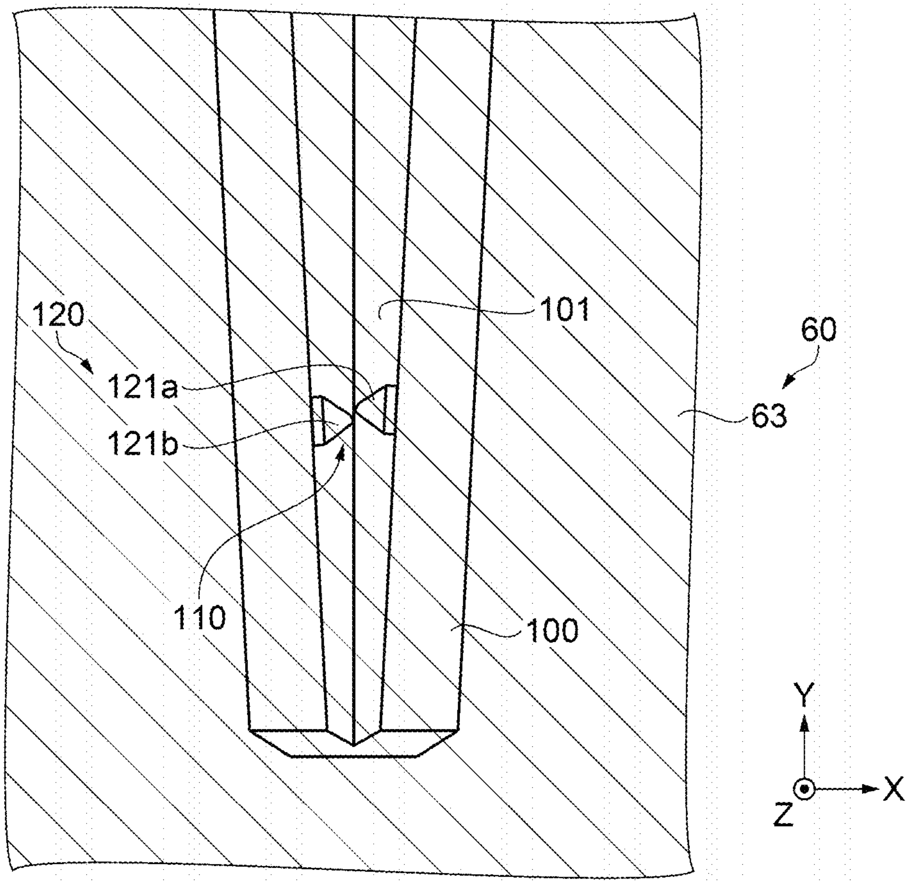
FIG. 10B is a plan view showing configuration of the discharge portion according to the first embodiment.

On the other hand, as shown in FIG. 10B, when the discharge portion 100 is inserted into the waste liquid storage unit 60, the discharge portion 100 is pressed by the first absorber 63, and the free ends of the first opening and closing plate 121*a* and of the second opening and closing plate 121*b* are displaced in the +Y direction. Accordingly, when the waste liquid storage unit 60 is mounted to the waste liquid collecting unit 50, the valve 120 provided in the groove portion 101 enters the opened state, and waste liquid can flow.

Therefore, by disposing the valve 120 in the groove portion 101, waste liquid can smoothly flow without flow of the waste liquid being inhibited when the waste liquid storage unit 60 is mounted. On the other hand, when the waste liquid storage unit 60 is removed, the valve 120 enters the closed state and the waste liquid can be reliably stopped.

Note that the opening and closing mechanism of the valve 120 may be a mechanism utilizing the urging force of a spring or the like.

Next, configuration of a waste liquid holding unit 71 will be described.

Figure 11:
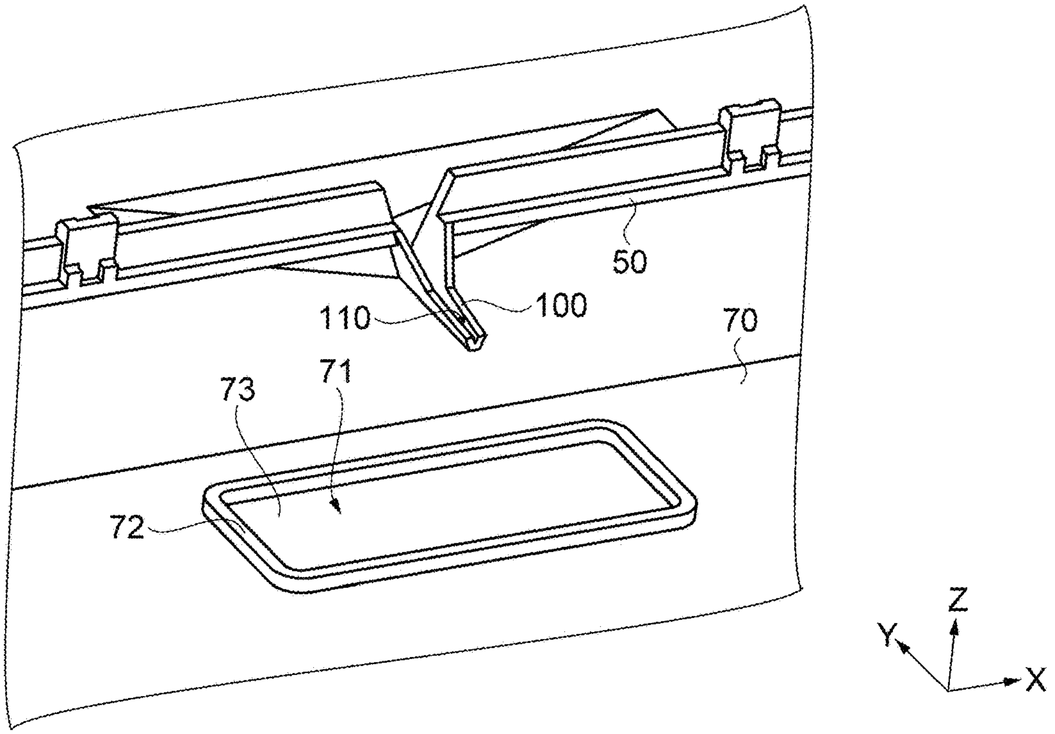
FIG. 11 is a perspective view showing configuration of the waste liquid holding unit according to the first embodiment.

As shown in FIG. 11, the recording device 10 includes the waste liquid holding unit 71, which holds waste liquid that fell from the discharge portion 100 to the device body 12 when the waste liquid storage unit 60 is removed from the device body 12.

The waste liquid holding unit 71 is provided in a region of the device body 12 facing the waste liquid storage unit 60 when the waste liquid storage unit 60 is mounted. The waste liquid holding unit 71 of the present embodiment is provided on the bottom plate portion 70. Accordingly, for example, when the waste liquid storage unit 60 is removed, waste liquid that flowed out over the dam portion 110 and fell from the discharge portion 100 to the lower portion of the device body 12 can be held.

The waste liquid holding unit 71 is disposed in the device body 12 so as to include a region vertically below a free end (end portion in the −Y direction) of the discharge portion 100. Thus, the waste liquid flowing out over the dam portion 110 and falling from the free end of the discharge portion 100 to the device body 12 can be held.

Further, the waste liquid holding unit 71 is arranged so as to include a region vertically below the dam portion 110. This makes it possible to hold, at the position where the dam portion 110 is provided, waste liquid that has flowed out beyond the dam portion 110 and dropped from the discharge portion 100 to the device body 12.

The waste liquid holding unit 71 is a recess 73 surrounded by a wall 72. The wall 72 is a wall formed to protrude upward from the upper surface of the bottom plate portion 70. Thus, waste liquid flowing out over the dam portion 110 can be held in the recess 73.

Figure 12:
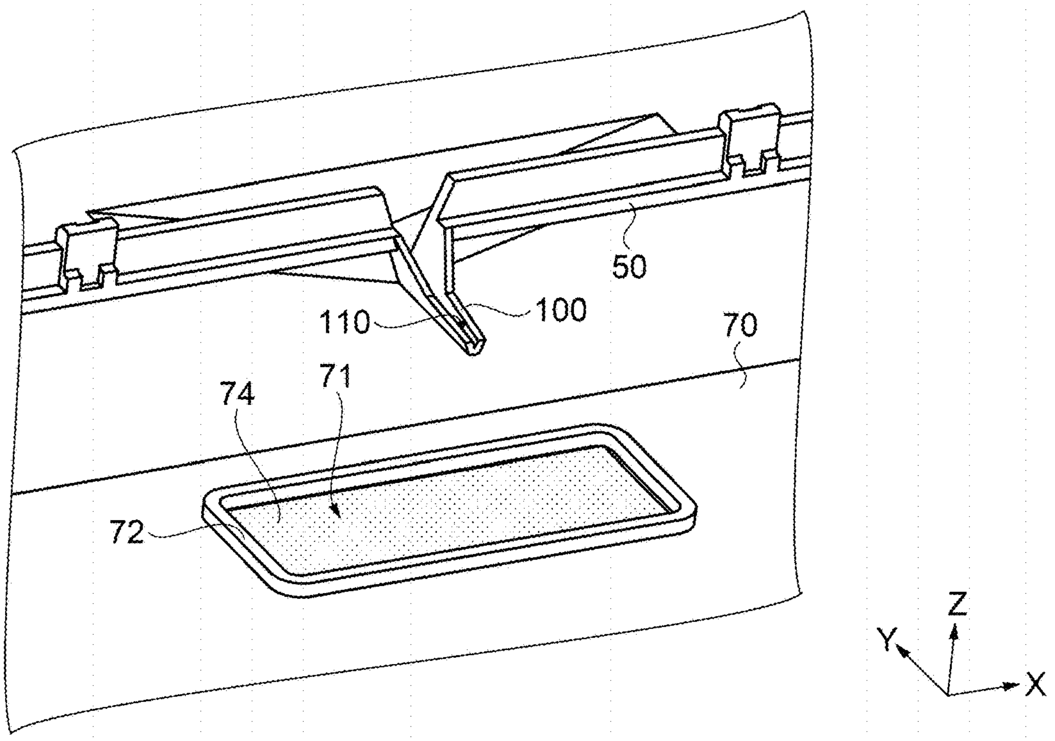
FIG. 12 is a perspective view showing configuration of another waste liquid holding unit.

As shown in FIG. 12, the waste liquid holding unit 71 may include a second absorber 74 that absorbs waste liquid. The second absorber 74 is, for example, a nonwoven fabric. The second absorber 74 is disposed in the recess 73 surrounded by the wall 72. As a result, waste liquid that has fallen from the discharge portion 100 is absorbed by the second absorber 74, so that the fallen waste liquid can be held more reliably. Note that the second absorber 74 is replaceable as appropriate.

Figure 13:
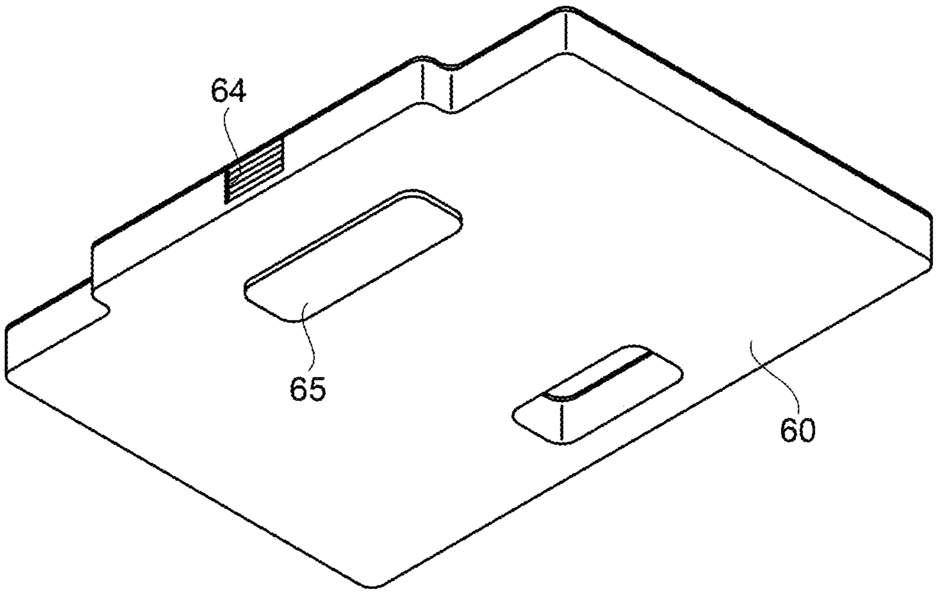
FIG. 13 is a perspective view showing configuration of another waste liquid storage unit.

Furthermore, as shown in FIG. 13, the waste liquid holding unit 60 may be a configuration that includes, at a region facing the waste liquid holding section 71 when the waste liquid storage unit 60 is mounted, a third absorber 65 that absorbs waste liquid held by the waste liquid holding section 71. The third absorber 65 is, for example, a nonwoven fabric.

By absorbing the waste liquid of the waste liquid holding unit 71 at the waste liquid storage unit 60 side, it is possible to promote drying of the waste liquid in the waste liquid holding unit 71 in the time until the waste liquid storage unit 60 is mounted, and increase the amount of waste liquid that can be absorbed by the third absorber 65. In addition, it is possible to promote drying of the waste liquid absorbed by the third absorber 65 in the time from when the waste liquid storage unit 60 is mounted to the third absorber 65 to when the waste liquid storage unit 60 is next replaced. Accordingly, it is possible to suppress contamination of the bottom plate portion 70, the user's fingers, a surface on which the waste liquid storage portion is placed, or the like by waste liquid that clings to the outer surface of the waste liquid storage unit 60 when the waste liquid storage unit 60 is removed and mounted. Furthermore, since the waste liquid in the waste liquid holding unit 71 can be collected by replacing the waste liquid storage unit 60, maintenance such as cleaning of the waste liquid holding unit 71 can be simplified.

2. Second Embodiment

Next, a second embodiment will be described. Note that the same configuration as in the first embodiment is denoted by the same reference numerals, and redundant description will be omitted.

In the above embodiment, the dam portion 110 is the valve 120, but a dam portion 110A of the present embodiment is a blocking wall 122.

Figure 14:
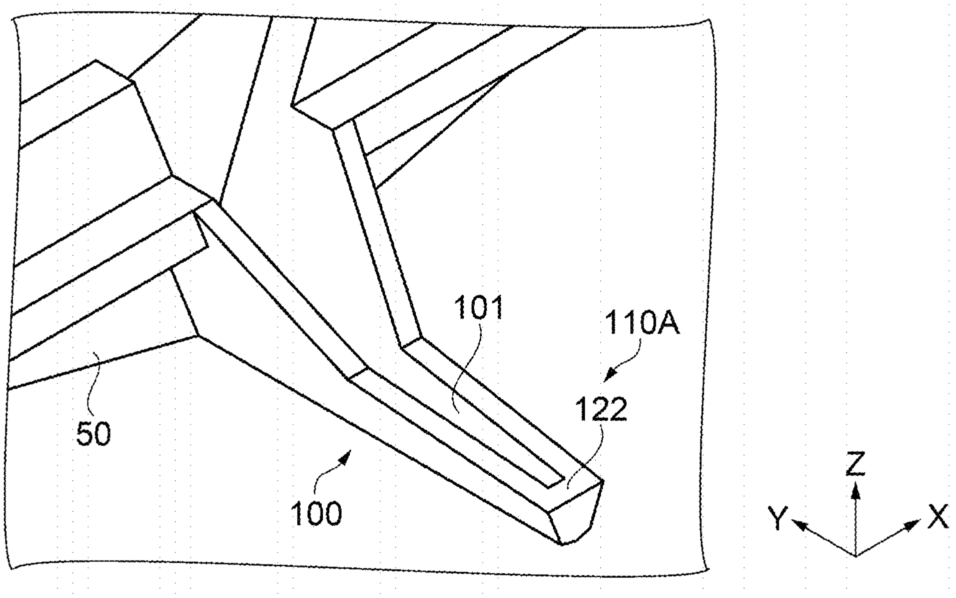
FIG. 14 is a perspective view showing configuration of a discharge portion according to a second embodiment.

As shown in FIG. 14, the blocking wall 122 is a wall that blocks flow of waste liquid in the discharge portion 100. Specifically, the blocking wall 122 is a wall formed in a part of the groove portion 101. The blocking wall 122 is formed from the bottom portion of the groove portion 101 in the +Z direction. The blocking wall 122 of the present embodiment has a height dimension equivalent to the depth dimension of the groove portion 101. The blocking wall 122 may be formed integrally with the discharge portion 100, or may be formed by applying a resin material to the groove portion 101, for example. The blocking wall 122 is disposed at a −Y direction end portion of the discharge portion 100. Accordingly, waste liquid flowing in the −Y direction is stopped from flowing by the blocking wall 122.

Therefore, even when the waste liquid storage unit 60 is removed from the device body 12, the waste liquid can be reliably blocked by a simple configuration.

Figure 15:
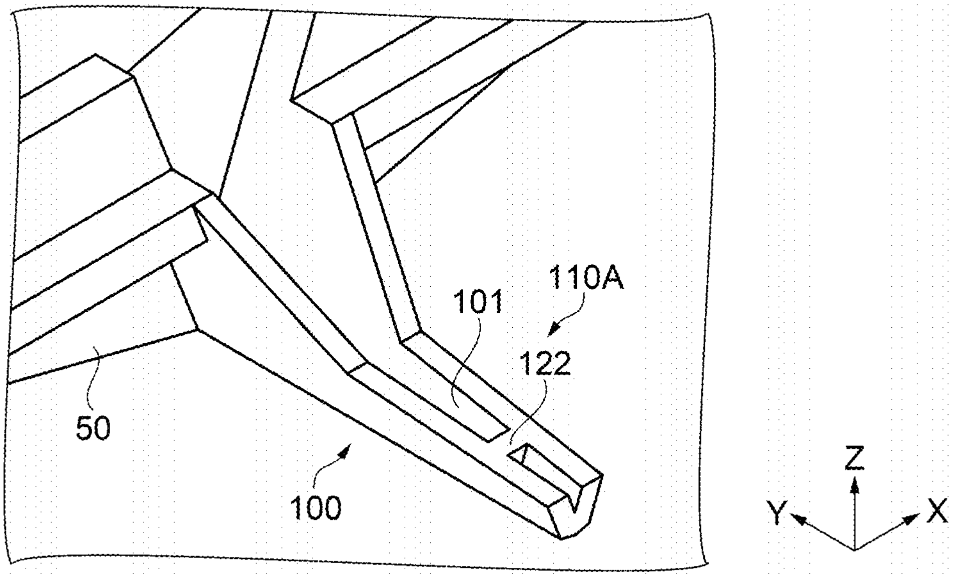
FIG. 15 is a perspective view showing configuration of another discharge portion.

Note that the position of the blocking wall 122 is not limited to the −Y direction end portion of the discharge portion 100, and for example, as shown in FIG. 15, the blocking wall 122 may be at a position in the +Y direction from the −Y direction end portion of the discharge portion 100. By making it this way, the same effects as described above can be obtained.

Further, the height position of the blocking wall 122 may be lower than the top portion of the groove portion 101. Further, a plurality of blocking walls 122 may be disposed in the groove portion 101.

3. Third Embodiment

Next, a third embodiment will be described. Note that the same configuration as in the first embodiment is denoted by the same reference numerals, and redundant description will be omitted.

In the second embodiment, the dam portion 110A is the blocking wall 122 and is fixed to the groove portion 101, but it is not limited thereto. The blocking wall 123 on the dam portion 110B of the present embodiment is deformable.

The blocking wall 123 is a plate member formed of a resin material. The blocking wall 123 is formed in a portion of the groove portion 101. The blocking wall 123 is disposed from the bottom portion of the groove portion 101 in the +Z direction. The blocking wall 123 has a height dimension equivalent to a depth dimension of the groove portion 101. Further, a lower portion of the blocking wall 123 and a bottom portion of the groove portion 101 are connected by a torsion spring. Accordingly, the blocking wall 123 becomes deformable with respect to the groove portion 101. The blocking wall 123 is urged so as to maintain an orientation along the Z-axis.

Figure 16A:
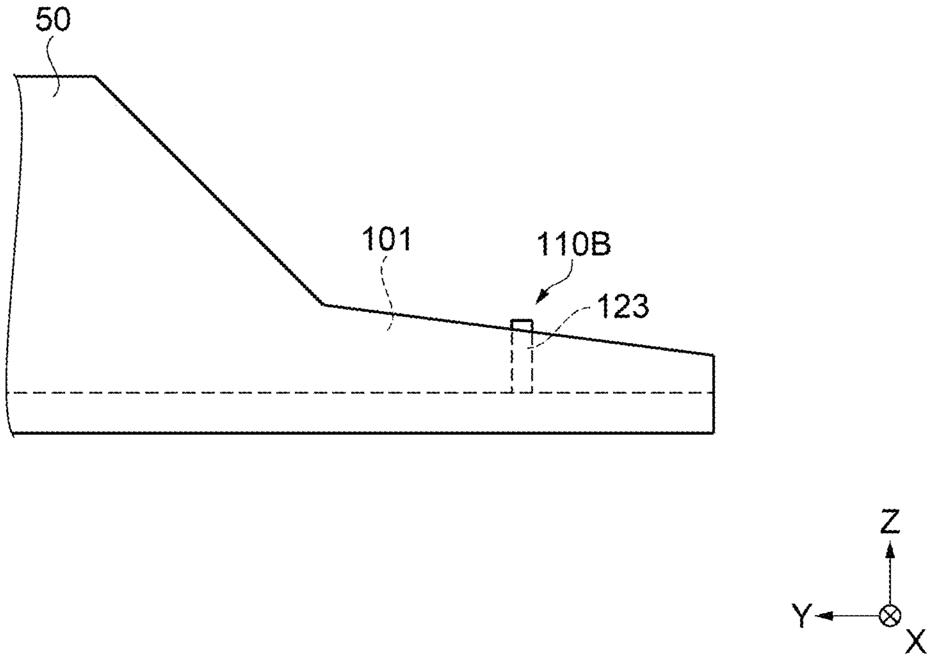
FIG. 16A is a schematic view showing configuration of a discharge portion according to a third embodiment.
Figure 16B:
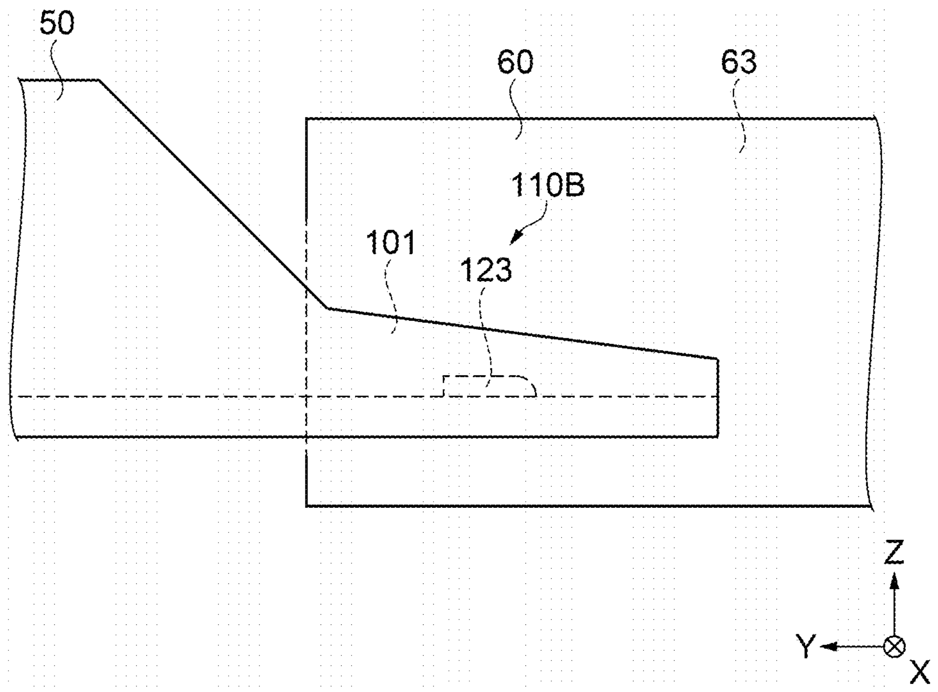
FIG. 16B is a schematic view showing configuration of the discharge portion according to the third embodiment.

As shown in FIG. 16A, when the waste liquid storage unit 60 is removed from the device body 12, the blocking wall 123 is in an orientation along the Z-axis and is in a first state in which the blocking wall 123 blocks the waste liquid. On the other hand, as shown in FIG. 16B, when the waste liquid storage unit 60 is mounted to the device body 12 (waste liquid collecting unit 50), the blocking wall 123 is pressed in the +Y direction by the first absorber 63 of the waste liquid storage unit 60, and therefore the tip portion of the blocking wall 123 moves in the +Y direction with respect to the bottom portion of the blocking wall 123, the groove portion 101 is opened, and a second state is assumed in which the waste liquid is not blocked.

As a result, since the blocking wall 123 is deformable, the flow of the waste liquid is not hindered and can be made to flow smoothly when the waste liquid storage unit 60 is mounted. Further, waste liquid can be reliably blocked when the waste liquid storage unit 60 is removed.

Note that the orientation of the blocking wall 123 when the waste liquid storage unit 60 is removed from the device body 12 is not limited to an orientation along the Z-axis, and may be an orientation intersecting with the direction along the Z-axis, that is, a configuration that slants upward.

In the above-described embodiments, the discharge portion 100 is provided with the groove portion 101, but it is not limited thereto. For example, the discharge portion 100 may be a pipe through which waste liquid flows. In this case, a dam portion 110 or the like is arranged in the pipe. Also in this manner, the same effects as described above can be obtained.

In the above embodiments, the discharge portion 100 of the waste liquid collecting unit 50 is inserted into the waste liquid storage unit 60, but it is not limited to this. For example, a configuration may be adopted in which the opening 64 is provided at an upper portion of the waste liquid storage unit 60, the discharge portion 100 is disposed at a position corresponding to an upper side of the opening 64, and the waste liquid that dripped from the discharge portion 100 and has been discharged is stored. Also in this manner, the same effects as described above can be obtained.

What is claimed is:

1. A recording device, comprising:
a device body;
a recording unit configured to record by ejecting liquid onto a medium;
a waste liquid collecting unit configured to collect waste liquid generated inside the device body;
a waste liquid storage unit configured to store the waste liquid collected via the waste liquid collecting unit, wherein
the waste liquid storage unit is configured to be mountable to and removable from the device body,
the waste liquid collecting unit includes a discharge portion configured to discharge the collected waste liquid to the waste liquid storage unit, and the discharge portion includes a dam portion configured to dam up the waste liquid and
the dam portion is a blocking wall that fixed to the discharge portion and blocks flow of waste liquid in the discharge portion.

2. The recording device according to claim 1, wherein
the discharge portion protrudes from the waste liquid collecting unit and is provided with a groove portion in which the waste liquid flows, and the dam portion is provided in the groove portion.

3. The recording device according to claim 1, wherein
the discharge portion is inserted into the waste liquid storage unit to discharge the waste liquid.

4. The recording device according to claim 1, wherein
the waste liquid storage unit includes a first absorber configured to absorb the waste liquid.

5. The recording device according to claim 1, wherein
the waste liquid collecting unit collects, as the waste liquid, liquid ejected from the recording unit that is outside of edge portions of the medium when the recording unit is recording.

6. The recording device according to claim 1, further comprising:
a cleaning unit configured to perform cleaning by forcibly discharging liquid from the recording unit to maintain the recording unit in a normal state, wherein
the waste liquid collecting unit collects, as the waste liquid, liquid discharged when the cleaning unit is cleaning.

7. The recording device according to claim 1, wherein
the waste liquid collecting unit collects, as the waste liquid, liquid discharged from the recording unit in order to keep the recording unit in a normal state.

8. A recording device, comprising:
a device body;
a recording unit configured to record by ejecting liquid onto a medium;
a waste liquid collecting unit configured to collect waste liquid generated inside the device body;
a waste liquid storage unit configured to store the waste liquid collected via the waste liquid collecting unit, and
a waste liquid holding unit configured to hold the waste liquid that is flowed out over the dam portion and drops from the discharge portion to the device body when the waste liquid storage unit is removed, wherein
the waste liquid storage unit is configured to be mountable to and removable from the device body,
the waste liquid collecting unit includes a discharge portion configured to discharge the collected waste liquid to the waste liquid storage unit, and the discharge portion includes a dam portion configured to dam up the waste liquid, and the waste liquid holding unit is provided in a region in the device body that, when the waste liquid storage unit is mounted, faces the waste liquid storage unit.

9. The recording device according to claim 8, wherein the waste liquid holding unit includes a region in the device body vertically below a free end of the discharge portion.

10. The recording device according to claim 8, wherein the waste liquid holding unit includes a region in the device body vertically below the dam portion.

11. The recording device according to claim 8, wherein the waste liquid holding unit is a recess surrounded by a wall.

12. The recording device according to claim 8, wherein the waste liquid holding unit includes a second absorber configured to absorb the waste liquid.

13. The recording device according to claim 8, wherein the waste liquid storage unit includes, in a region facing the waste liquid holding unit when the waste liquid storage unit is mounted, a third absorber configured to absorb waste liquid held by the waste liquid holding unit.

14. The recording device according to claim 8, wherein the waste liquid collecting unit collects, as the waste liquid, liquid ejected from the recording unit that is outside of edge portions of the medium when the recording unit is recording.

15. The recording device according to claim 8, further comprising:

a cleaning unit configured to perform cleaning by forcibly discharging liquid from the recording unit to maintain the recording unit in a normal state, wherein the waste liquid collecting unit collects, as the waste liquid, liquid discharged when the cleaning unit is cleaning.

16. The recording device according to claim 8, wherein the waste liquid collecting unit collects, as the waste liquid, liquid discharged from the recording unit in order to keep the recording unit in a normal state.

17. A recording device comprising:

a device body;

a recording unit configured to record by ejecting liquid onto a medium;

a waste liquid collecting unit configured to collect waste liquid generated inside the device body;

a mounting section to which is mountable and removable a waste liquid storage unit configured to store waste liquid collected via the waste liquid collecting unit, wherein the waste liquid collecting unit includes a discharge portion configured to discharge the collected waste liquid to the waste liquid storage unit mounted to the mounting section, and the discharge portion has a dam portion for damming up the waste liquid and the dam portion is a blocking wall that fixed to the discharge portion and blocks flow of waste liquid in the discharge portion.

* * * * *